United States Patent [19]

Suzuki

[11] Patent Number: 4,686,571
[45] Date of Patent: Aug. 11, 1987

[54] PICTURE IMAGE INFORMATION READ-OUT METHOD AND APPARATUS

[75] Inventor: Kenji Suzuki, Kaisei, Japan

[73] Assignee: Fuji Photo Film Co., Ltd., Ashigara, Japan

[21] Appl. No.: 767,909

[22] Filed: Aug. 21, 1985

[30] Foreign Application Priority Data

Sep. 5, 1984 [JP] Japan .................. 59-185898

[51] Int. Cl.[4] ............................................. H04N 3/14
[52] U.S. Cl. ................................................... 358/213
[58] Field of Search ................. 358/213, 216; 250/578

[56] References Cited

U.S. PATENT DOCUMENTS

| 4,153,915 | 5/1979 | McKechnie | 358/213 |
| 4,263,620 | 4/1981 | Felix | 358/213 |
| 4,556,800 | 12/1985 | Ohta et al. | 358/213 |
| 4,581,651 | 4/1986 | Miyata et al. | 358/213 |

OTHER PUBLICATIONS

Matteson, Ronald G., "Asynchronous Charge-Coupled Device Imager (CCD) Architecture", Xerox Disclosure Journal, Oct. 1981, vol. 6, No. 5, pp. 277–280.

Primary Examiner—W. B. Perkey
Attorney, Agent, or Firm—Wenderoth, Lind & Ponack

[57] ABSTRACT

In an image information read-out operation, the image information is synchronized with a clock signal which is then photoelectrically converted and the converted image information is accumulated in a accumulating unit. The clock signal from a clock signal generating circuit is inputted into a switching circuit in which the clock signal is divided so as to have first and second frequency. The clock signal from the switching circuit is processed with the first frequency until it is transferred into storage unit and the stored image information is then read out with the second frequency which is low rate compared with the first frequency.

5 Claims, 5 Drawing Figures

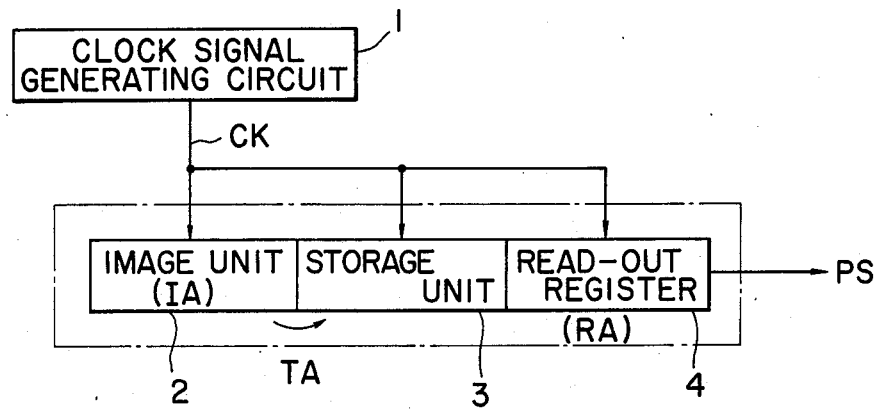
FIG. I
PRIOR ART
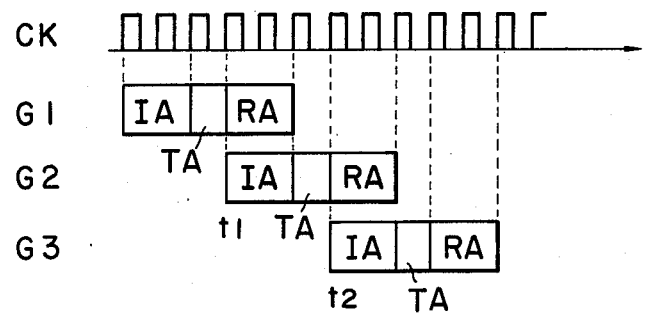
FIG. 2
PRIOR ART

PICTURE IMAGE INFORMATION READ-OUT METHOD AND APPARATUS

BACKGROUND OF THE INVENTION

This invention relates to a method and an apparatus for effectively reading out a picture image information in accordance with an operation cycle consisting of photoelectric conversion, accumulation, transference, storage and read-out steps in use of a solid state image pick-up device.

Recently, image sensors have been widely improved with the development of the solid state device mainly containing an integrated circuit. However, it may be said that these image sensors have not yet fully satisfied various requirements, and accordingly, many attempts have been paid to devices or equipments to which such image sensors are to be applied. Thus, a picture image information read-out device becomes itself complicated and expensive.

FIG. 1 is a block diagram representing a circuit system generally utilized on these days for reading out picture images by means of a solid state image pick-up tube and shows a case in which an image sensor consisting of a charge coupled device (CCD) is utilized as a solid state image pick-up element and the image information is synchronized with a clock signal CK at an image unit 2 and subjected to photoelectric conversion (IA), and thereafter, the converted information is transferred (TA) into a storage unit 3. An electric charge pattern once stored in the storage unit 3 is transferred by a standard scanning method or system and then read out (RA) from a read-out register 4 as a picture image signal (PS). The cycle consisting of these steps of photoelectric conversion (IA), transference (TA), storage and read-out (RA) is evenly controlled by the clock signal CK provided with predetermined frequencies and generated from a clock signal generating circuit 1 and the timings of the generations of the clock signal CK from the clock signal generating circuit 1 are shown in FIG. 2.

Referring to FIG. 2, under the timing of the clock signal CK, upon a time t1 when the photoelectric conversion (IA) and the transference (TA) have been completed as steps of the picture image read-out cycle of an image of a picture image G1, an accumulated image information (G1) is read out and the next read-out cycle of the next picture image G2 is started. Likewise, upon a time t2 when the transference and the storage of the image information of the picture image G2 have been completed, the accumulated image information (G2) is read out (RA) and the next read-out cycle of the next picture image G3 is started. These read-out cycles are sequentially continued with the similar manner.

As a frequency of the clock signal CK for controlling each read-out cycle is required a relatively high frequency of several hundreds KHz to several MHz, and in case this frequency is low, a dark current may adversely increase and smear may be generated because the accumulated time and transferring time are elongated, thus resulting in degradation in quality of the image data. For the reason described before, a quick speed performance is required for these peripheral circuit elements, and the solid state image pickup device of this type becomes expensive.

Namely, when the frequency of the clock signal being drive signal of the image sensor is lowered, the dark current is adversely increased and the smear also occurs thereby to degrade the quality of a product, and inversely, when the frequency of the clock signal is increased for preventing the degradation of the quality thereof, the image signal is outputted at a speed in response to the thus increased high frequency, which requires a sampled-and-hold circuit for obtaining the matching between the speed of image processing of the system and the same of the image signal and also requires a high-speed analog to digital (A/D) converter.

SUMMARY OF THE INVENTION

An object of this invention is to eliminate defects or problems encountered to the prior art technique and to provide a method for reading out image information and a solid state image pick-up device for realizing the method without degrading the quality of the image data even if the image information is read out at low speed.

Another object of this invention is to provide a method and apparatus for reading out image information in which photoelectric conversion, transference, and storage steps are carried out with high speed processing and a read-out process is carried out with low speed processing, thereby to eliminate the use of a sampled-and-hold circuit and an expensive A/D converter.

According to this invention, in one aspect, there is provided a method for reading out image information in which the image information is synchronized with a clock signal which is then photoelectrically converted, transferred stored and read out as an image signal and in the improvement of the method, the image information read with a first frequency of the clock signal is read out with a second frequency of the clock signal which is low rate compared with the first frequency.

In another aspect of this invention, there is provided an apparatus for reading out image information comprising a circuit for generating a clock signal regarding image information, a circuit in which the clock signal from the clock signal generating circuit is processed so as to have first and second frequencies and which generates a clock signal in a switched manner to generate a clock signal having the first frequency or second frequency, a unit for photoelectrically converting the image signal in synchronism with the clock signal from the clock signal switching circuit, a unit for storing the image information with the first frequency transferred from the photoelectrically converting unit, and a unit for reading out a stored image information with the second frequency which is low rate compared with the first frequency.

The nature, principle and utility of the invention will become more apparent from the following detailed description when read in cojunction with the accompanying drawings.

BRIEF DESCRIPTION OF THE DRAWINGS

In the accompanying drawings:

FIG. 1 is a block diagram showing a conventional read-out device for an image information:

FIG. 2 shows a graph for explaining the timing of a read-out cycle of the read-out device shown in FIG. 1;

DESCRIPTION OF THE PREFERRED EMBODIMENTS

Figure 3:
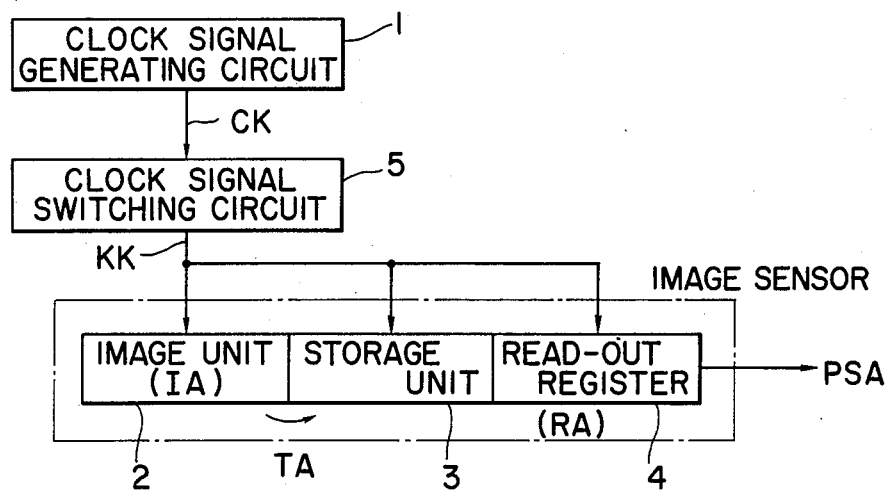
FIG. 3 is a block diagram showing a read-out device for an image information according to this invention.

FIG. 3 is a block diagram representing a system to which a method of this invention is applied, in which a clock signal CK with a predetermined frequency transmitted from a clock signal generating circuit 1 is inputted into a clock signal switching circuit 5 in which two frequencies f1 and f2 are produced in response to processing cycles of an image sensor and a clock signal KK is transmitted therefrom by suitably switching the frequencies. Image information is synchronized with the clock signal KK in an image unit 2 and then subjected to the photoelectric conversion (IA). Thereafter, the converted and accumulated signal is transferred into a storage unit 3, in which it is once stored as an electric charge pattern which is then transferred by a standard scanning method or manner, and then read out (RA) from a read -out register 4 thereby to output an image signal PSA. This read-out cycle is substantially the same as that carried out in the prior art technique as described hereinbefore. This cycle consisting of the photoelectric conversion, transference, storage and read-out steps is controlled by the clock signal KK from the clock signal switching circuit 5.

Figure 4:
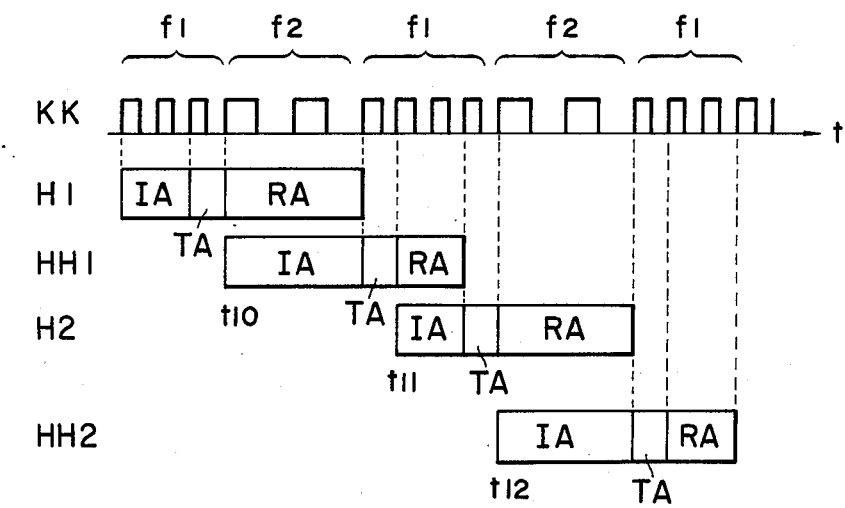
FIG. 4 shows a graph for explaining the timing of a read-out cycle of the read-out device shown in FIG. 4.

The timing of the processing cycle in the construction described above will be explained hereunder with reference to FIG. 4.

With the first picture image H1, the cycle including the steps of the photoelectric conversion, transference and storage is carried out at a high speed with the high frequency f1, and the read-out at the time t10 after the completion of the transference is processed with the clock signal having a low frequency f2. Namely, the photoelectric conversion, transference and storage of the picture image H1 are performed at a quick timing as they are carried out conventionally and the read-out thereof is performed at a low speed with a sufficient long time. When the image information is read out at a low speed, the image information of the picture image HH1 is parallelly photoelectrically converted and accumulated. However, the processing the picture image HH1 is performed with a dark current, so that the picture quality is not good and this image information can not be utilized for the picture signal PSA. The accumulation of the image information with respect to the second picture image HH1 is carried out by the same timing as the read-out timing regarding the first picture image H1, so that the accumulated time is elongated and no good picture quality is obtained, and accordingly, this image information is obliged to be neglected. The image information of the third picture image H2 is then photoelectrically converted and accumulated by a clock signal with a frequency f1 and at a high speed from the read-out starting time t11 of the image information with low quality not to be used for the image signal PSA and the read-out process of the thus accumulated image information is started by a clock signal with a frequency f2 and at a low speed after the completion of the transference at a time t12. During this read-out time, although the image information regarding the next picture image HH2 is accumulated, this image information is not used for the image signal PSA for the same reason as described above regarding the picture image HH1. With the likewise manner, the photoelectric conversion, transference and the storage of the image information are carried out by the clock signal KK with the frequency f1 and at a high speed, and the read-out process is then carried out by the clock signal KK with the frequency f2 and at alow speed, whereby the image information accumulated at the low speed operation is not outputted as the image signal PSA. Accordingly, the image information regarding the inputted every other picture image is read out and outputted as the image signal PSA.

In the prior art technique, since the read-out process was carried out with the high speed manner as well as the transference and the storage processes of the image information, it was required to process the image information with a sampled-and-hold circuit or an A/D converter in response to the read-out speed thereof. On the other hand, according to the method and apparatus of this invention, since the photoelectric conversion accumulation, transference and storage are carried out at a high speed and the read-out is then performed at a sufficiently low speed, it is not necessary to utilize a high-speed and high-performance A/D converter. In a preferred experiment, when a clock signal with a frequency of about 1.5 MHz is utilized for the transference and the accumulation of the image information, the frequency of the clock signal could be decreased to about 20 KHz in the read-out process, and accordingly, a sampled-and-hold circuit of the type described before is not required and the A/D converter to be used does not require the high-speed performance, thus being used a cheap normal A/D converter. In addition, since peripheral circuit elements with relatively low speed performance can be used and a considerable margin can be given to the timing of the various steps of the read-out cycle, the circuit can be designed with a considerable time and it becomes possible to deal with the dispersion of the respective elements, temperature variation and noises. Moreover, the neglect of the sampled-and-hold circuit widely decreases the numbers of the circuit elements and the analog and digital areas can be stored in one card, though these areas were stored in two cards, respectively, in the prior art technique, thus being improved space factors. As a result, the realization of the digital output of the image information makes possible to design a circuit with high resistance against the noises.

Figure 5:
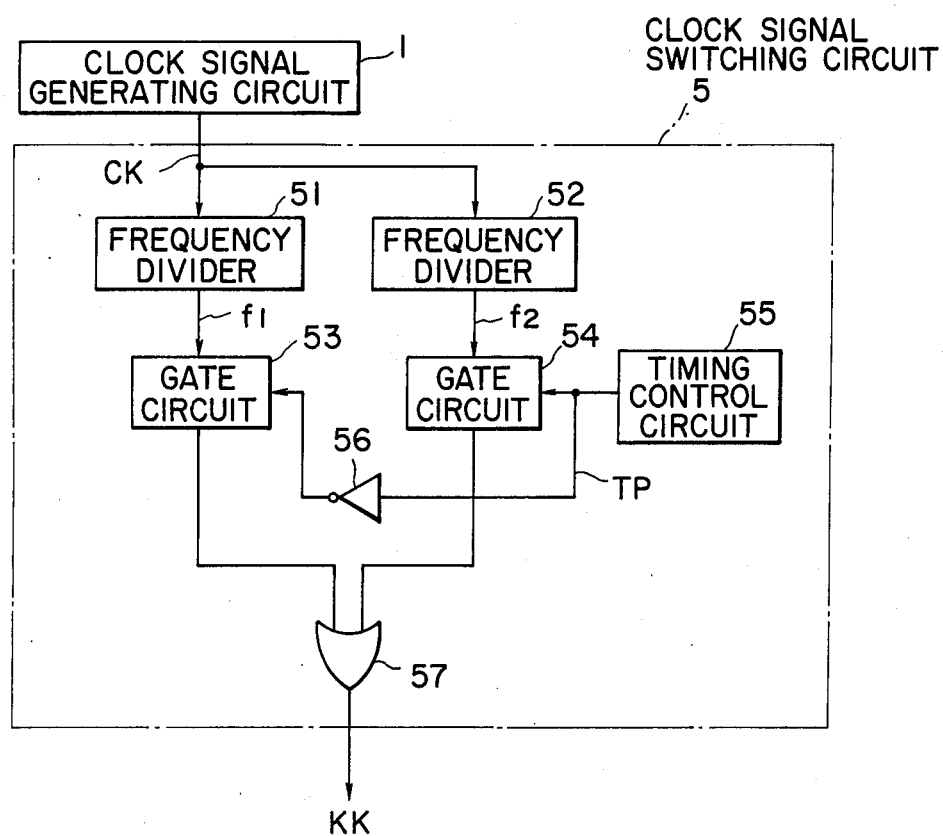
FIG. 5 shows a block diagram of a clock signal switching circuit of the read-out device shown in FIG. 3.

FIG. 5 shows a block diagram of one example of the clock signal switching circuit 5 shown in FIG. 3, according to this invention in which the clock signal CK from the clock signal generating circuit 1 is inputted into frequency dividers 51 and 52 to divide the frequency of the clock signal CK into two frequencies f1 and f2, respectively, which are then inputted into gate circuits 53 and 54. These gate circuits 53 and 54 are controlled by a timing pulse TP generated from a timing control circuit 55 so that one of these gate circuits is made open and the clock signal KK is outputted through an OR gate circuit 57. In this example of the clock signal switching circuit 5, the frequency divider 51 may be neglected so that the clock signal CK is directly inputted into the gate circuit 53.

With the embodiment described hereinabove, the description is developed to a FT (flame transfer) system of the CCD, but a like description a can be applied to a IL (inter line) system of the CCD.

According to this invention, as described hereinbefore, a solid state image pick-up device provided with a small number of cheap circuit elements and constructed relatively simply with high performance. Particularly, the photograph printing amendment characteristic in the printing operation of a negative film can be improved by the image information read-out method according to this invention.

It should be understood that many modifications and adaptations of the invention will become apparent to those skilled in the art and it is intended to encompass such obvious modifications and changes in the scope of the claims appended hereto.

What is claimed is:

1. An apparatus for reading out image information which comprises:

circuit means for generating a clock signal regarding image information;

circuit means in which said clock signal from said clock signal generating circuit means is processed so as to have first and second frequencies and which generates a clock signal in a switched manner to generate a clock signal having the first frequency or second frequency;

a unit for photoelectrically converting the image signal in synchronism with the clock signal from the clock signal switching circuit means;

a unit for accumulating the image information with the first frequency transferred from said photoelectrically converting unit; and a unit for reading out a stored image information with the second frequency which is low rate compared with the first frequency.

2. The apparatus according to claim 1 wherein said clock signal switching circuit means comprises a frequency divider to divide the frequency of the clock signal from said clock signal generating circuit means into the first and second frequencies, a gate circuit into which said first or second frequency is inputted, a control circuit generating a timing pulse for controlling said gate circuit, and an OR circuit through which a clock signal controlled by said control circuit is generated to said read-out unit.

3. A method for reading out image information by using a solid state image pick-up device, comprising the steps of:

feeding a first clock signal to the solid state image pick-up device during photoelectric conversion, accumulation, transference and storage operations thereof; and feeding a second clock signal to the solid state image pick-up device during a read-out operation thereof wherein a frequency of the first clock signal is higher than a frequency of the second clock signal.

4. A method for reading out image information using a solid state image pick-up device, comprising the steps of:

providing a first clock signal which has a constant frequency;

providing a second clock signal which has a constant frequency which is lower than that of the first clock signal;

switching between the first and second clock signals in accordance with an operation cycle of the solid state image pick-up device; and feeding the switched clock signal to the solid state image pick-up device.

5. A method according to claim 4, wherein the first clock signal is fed to the pick-up device during photoelectric conversion, accumulation, transference and storage operations of the solid state image pick-up device and the second clock signal is fed to the pick-up device during a read-out operation thereof.

* * * * *